United States Patent [19]

Briggs et al.

[11] 4,442,164

[45] Apr. 10, 1984

[54] FIBROUS COMPOSITE MATERIALS AND THE PRODUCTION AND USE THEREOF

[75] Inventors: Peter J. Briggs, Cheadle Hume; Kevin McAloon, Appleton Thorn; Graham R. Rideal, Handbridge, all of England

[73] Assignee: Imperial Chemical Industries Ltd., London, England

[21] Appl. No.: 545,103

[22] Filed: Oct. 24, 1983

Related U.S. Application Data

[63] Continuation of Ser. No. 281,104, Jul. 7, 1981, abandoned.

[30] Foreign Application Priority Data

Jul. 11, 1980 [GB] United Kingdom ................ 8022713

[51] Int. Cl.³ .......................... B32B 5/16; D02G 3/00
[52] U.S. Cl. ..................................... 428/283; 428/281; 428/288; 428/324; 428/372; 428/454; 162/181.4; 162/181.5; 162/181.6; 162/181.8
[58] Field of Search ............... 428/281, 283, 288, 289, 428/323, 324, 454, 372; 162/156, 181.4, 181.5, 181.6, 181.8, 128, 129, 152

[56] References Cited

U.S. PATENT DOCUMENTS

| | | | |
|---|---|---|---|
| 2,481,391 | 9/1949 | Campbell | 106/74 |
| 2,782,129 | 2/1957 | Donegan | 428/148 |
| 3,434,917 | 3/1969 | Kraus et al. | 162/152 |
| 3,540,892 | 11/1970 | Lord et al. | 106/18.25 X |
| 3,556,819 | 1/1971 | Koons | 106/18.12 X |
| 3,779,860 | 12/1973 | Oshida et al. | 162/145 X |
| 3,916,057 | 10/1975 | Hatch et al. | 428/241 X |
| 4,271,228 | 6/1981 | Foster et al. | 428/237 X |

Primary Examiner—Lorraine T. Kendell
Attorney, Agent, or Firm—Cushman, Darby & Cushman

[57] ABSTRACT

A fibrous composite material of essentially two-dimensional form in the form of individual fibres, sheets or layers comprising combustible fibres and lamellae of a layer mineral of size below 50 microns, a method for the manufacture of the fibrous composite materials by applying lamellae of a layer mineral to the fibres preferably from suspension followed by removal of the liquid phase of the suspension, and use of the fibrous composite materials for the fire-protection of substrates.

14 Claims, No Drawings

FIBROUS COMPOSITE MATERIALS AND THE PRODUCTION AND USE THEREOF

This is a continuation of application Ser. No. 281,104, filed July 7, 1981, now abandoned.

This invention relates to fibrous materials and particularly to fibrous composite materials comprising fibres which have been coated with or embedded in an inorganic material to upgrade the fibres, and to the production and use of the fibrous composite materials.

Fibres and fibrous materials made from them are notoriously susceptible to damage or destruction by fire. Fibres, whether natural or man-made fibres, comprising organic materials, for example wool, cotton, rayon, cellulose acetate, polyesters, polyamides and lignocellulosic fibres are combustible and generally readily flammable.

It would clearly be advantageous, for example in the textile, furnishing and building industries, if fibres and particularly the less expensive, organic fibres, could be upgraded to improve their fire performance e.g. fire resistance and flame retardancy, and numerous treatments have been proposed for achieving this desirable result by coating the fibres with or embedding them within a fire-resistant material or by incorporating a fire-resistant material in the fibre structure. Hitherto, no satisfactory solution to the problem has been achieved; in particular no solution has been found which combines satisfactory fire performance with acceptable expense whilst retaining the flexible nature of the fibres and materials made from them.

According to the present invention there is provided a fibrous composite material of essentially two-dimensional configuration comprising combustible fibres and lamellae of a layer mineral wherein the lamellae are substantially all of size below 50 microns. Preferably the fibrous composite material comprises at least 15% by weight and preferably at least 20% by weight of the fibres.

There is also provided a method for the manufacture of the fibrous composite material by applying the lamellae to fibres, preferably from suspension in an inert carrier liquid.

The method for the manufacture of the composite material is also a method of upgrading the fire-performance of combustible fibres.

Vermiculite is the preferred layer mineral. By "vermiculite" we mean all materials known mineralogically and commercially as vermiculite, including the chlorite-vermiculites.

By the term "lamellae of a layer mineral" as used throughout this specification we mean tiny particles of the layer mineral obtained by chemically delaminating the layer mineral into particles or platelets having a high aspect ratio. Thus for example vermiculite lamellae obtained by chemical delamination are tiny platelets obtained by chemical delamination of vermiculite and having a thickness of less than 0.5 micron, usually less than 0.05 micron and preferably less than 0.005 micron, and having an aspect ratio (i.e. length or breadth divided by thickness) of at least 10, preferably at least 100 and more preferably at least 1000, for example 10,000. The lamellae obtained by chemical delamination of other layer minerals are of similar dimensions to those of vermiculite lamellae.

Whilst vermiculite is the preferred layer mineral, other layer minerals which may be used include montmorillonite, Kaolinite (and clays comprising sepiolite Kaolinite, for example kaolins and ball clays) and other layer-silicate minerals which can be chemically deliminated to provide lamellae or plate-like particles.

The fibrous composite materials of the invention may have a wide variety of forms and the layer mineral lamellae may be present in the composite as a coating on the individual fibres of the composite, as a layer in which the fibres are embedded or as a coating or facing layer on one or both sides of a fibrous material such as a woven fabric or a felt, or as an inner layer between layers of the fibrous material. By way of illustration only and without in any way restricting the scope of the present invention, the following product forms are included within the term fibrous composite material:

3. A layer of fibres faced on one or both sides with a layer of lamellae.
4. Strands comprising multiple filaments, e.g. 100 to 1000 filaments, having lamellae coated onto the individual filaments and/or onto the strands.
5. Rovings comprising multiple strands twisted, doubled or plied together, having lamellae coated onto the filaments and/or the strands and/or onto the rovings.
6. A layer of fibres bonded together by lamellae.

It will readily be appreciated that each of the above product forms comprising a layer of fibres may comprise a multi-layer structure of fibres and that the fibre layers may comprise loose fibres or may be a woven, knitted, needlepunched, felted or otherwise unified structure. Furthermore, it is to be understood that in any of the product forms of the fibrous composite material the fibres may be continuous (filamentary) or discontinuous (staple), or agglomerates of fibres.

The amount by weight of lamellae applied to the mass of fibrous material may vary within wide limits depending for example upon the intended fire/temperature duty of the composite, the desired flexibility of the composite, the required degree of structural integrity of the composite before and after it has been subjected to a fine and whether the lamellae are applied as a coating or a facing for the fibrous material. In general, increasing the loading of lamellae on the fibrous material will increase the fire-performance of the fibres and the thermal condition which the composite will withstand. We have observed, however, that in general very thin layers of lamellae, for example less than 1 micron thickness, are all that is required to upgrade the fire-performance and the high-temperature performance of the fibres. As a guide only, the loading of the layer mineral on the fibres of the composite will usually be from 0.05% to 100% by weight, typically from 0.1% to 20% by weight, of the fibres. Amounts of the layer mineral greater than these may be used and indeed the composite may comprise as much or even more layer mineral than fibres such that the composite in effect becomes a fibre-reinforced layer of lamellae, for example where high flexibility in the composite is unnecessary or undesirable; the amount of fibres in such a structure should be at least 15% by weight and may be, for example from 20% to 50% by weight of the composite.

The amount of lamellae applied to the fibres will affect the degree of damage suffered by the fibres when the composite material is exposed to a flame or, to temperatures above the softening point of the fibres. Fibres coated thinly with the layer mineral may be charged or even burned by a flame high temperature whilst increasing the coating thickness increases the resistance of the fibres to damage by the flame. In most practical applications of the invention the fibres of the composite material are likely to be damaged or even completely burned by a flame or high temperatures, but in spite of this the fire-performance of the composite material is not seriously impaired, especially the fire-barrier and flame-retardant properties of the composite material.

It is known that thin sheets or papers can be formed from suspensions of lamellae of vermiculite, and that such sheets can be used to face combustible organic foam materials for fire-protection, such a product being described for example in our United Kingdom Patent Specification No. 2,007,153. We have observed, however, that when exposed to a fire such sheets or papers tend to curl and crack and thus do not satisfactorily retard burning of the substrate do not provide an adequate fire-barrier to protect combustible substrates on which they are used as facing materials. By contrast, and surprisingly, we have found that when the fibrous composite materials of the invention are exposed to a fire they do not curl or crack even when the coating layer of lamellae is extremely thin. Thus the fibrous composite materials of the invention provide better fire-barriers than sheets or papers comprising lamellae alone.

The fibrous composite materials are made by applying the layer mineral lamellae to a suitable fibrous substrate. Usually the lamellae will be applied from a suspension in a carrier liquid which may be for example an organic liquid, or water or another aqueous medium. Conveniently the suspension obtained in the process used for chemical delamination of layer minerals can be used directly to form the fibrous composite material. If desired, however, lamellae in the form of a free-flowing dry powder (as described for example in our European Patent Publication No 0009.311A) may be suspended in any suitable carrier liquid for application to the fibrous substrate. The solids content (lamellae) of the suspension is not critical may vary over a wide range. Any stable suspension may be employed. Typically, the solids content of the suspension will be up to 40% by weight of the suspension but may for the production of thin coatings be only a few %, say 2% by weight. Preferably the solids content of the suspension for most applications will be from 10% to 20% by weight.

After application of the suspension of the layer mineral to the fibrous substrate, the carrier liquid is removed, usually by evaporation, to leave the lamellae of the layer mineral deposited, preferably as a coherent layer, on the fibrous substrate. If desired excess carrier liquid may be sweezed from or allowed to drain from the composite material prior to heating the composite material to remove residual carrier liquid. The temperature at which the suspension is applied to the fibrous substrate can be any temperature up to or even greater than the boiling point of the carrier liquid, providing of course that the fibres are stable at such temperatures. We prefer to avoid temperatures above the boiling point of the carrier liquid since unless care is exercised a rapid evolution of gas may have an adverse effect upon the properties of the composite material.

The suspension (or slurry as it may also be termed) can be applied to the fibrous substrate by any known technique, including brushing (painting), spraying, doctoring, licking, knife-coating, 'nip'-coating, roller-coating, dip coating and impregnation or, in the case of loose fibres by co-depositing the fibres and layer minerals. It is a simple matter for the operator to choose a suspension strength and an application technique appropriate to applying the desired loading of lamellae onto any particular fibrous substrate.

The application technique employed for applying the lamellae to the fibrous substrate may vary, being different perhaps for coating individual fibres, strands and rovings than for coating woven, felted or otherwise unified fibrous materials.

If desired, the suspension of lamellae may be gasified to produce a froth for application to the fibrous substrate so that the layer mineral content of the resulting composite material may be present as a cellular (rigid foam) matrix. Conversion of a suspension of vermiculite lamellae to rigid foams is described, for example, in our United Kingdom Patent Specification No. 1,585,104.

In the case of coating individual fibres or yarns or strands, a specific embodiment of the invention residues in applying the coating during production of the fibre, yarn or strand. Thus for example, in the spinning of fibres such as glass fibres the "green", freshly-extruded fibres may be coated immediately with the suspension of lamellae, for example by spraying the fibres at a suitable point below the spinnerette orifice(s) or by spinning the fibres into a bath of the suspension. An alternative technique for coating fibres immediately after their extrusion is to dust the "green" fibres whilst they are still sticky with powder comprising the lamellae; however, because of the self-adhesion properties exhibited by the lamellae, especially vermiculite lamellae when deposited from aqueous suspension we prefer to apply an aqueous suspension to the fibres rather than dry powder.

Another technique for applying the lamellae to fibres is to employ a suspension of the lamellae as a textile size. Thus, for example, the suspension may be applied to glass fibres as a size using the techniques described in United Kingdom Patent Specification No. 2,016,993 and by K. L. Loewenstein in "The Manufacturing Technology of Continuous Glass Fibre" (an Elsevier publication).

Another technique particular to a specific product form arises in the case where the fibrous substrate of the composite material is a mat of fibres produced by a wet-lay or paper-making technique in which the fibres are suspended in a carrier liquid, usually water, and the fibre mat is laid down from the suspension. In such a case the suspension of fibres may include the lamellae by suspending the fibres in a suspension of lamellae, by suspending lamellae in a suspension of fibres or by mixing suspensions of fibres and lamellae. In this technique, a small amount of an organic binder, for example a rubber latex or polymer latex is often included in the suspension to afford handleability to the resulting mat, the organic binder subsequently being removed if desired by burning (provided, of course, that the fibres will withstand the burning conditions).

After application of the suspension of lamellae to the fibrous substrate, the wet substrate preferably is squeezed or to remove any air (especially bubbles) which may have become entrained, thereby enhancing the aesthetic appearance and handle of the composite material and reducing the occurrence of blistering of the coating in a fire.

The fibrous composite materials of the invention exhibit improved fire-performance and high temperature performance compared with the corresponding material made of the untreated fibres although the K-factor of the treated fibres will usually be slightly higher than that of the untreated fibres. Thus fibres which are inherently flammable can be rendered fire-resistance and fire-retardant. It is a general feature of the invention that the fire-performance and thermal properties of all non-combustible fibres and fibrous materials are upgraded by the application to them of a coating of lamellae of a layer mineral.

As stated hereinbefore, vermiculite is the preferred layer material. The reason for this preference is that in addition to conferring good fire resistance and thermal performance to the fibrous composite materials, chemically delaminated vermiculite when deposited from aqueous suspensions exhibits excellent self-adhesion properties. Upon removal of the water (or other carrier liquid) from suspensions of lamellae of chemically delaminated vermiculite, the lamellae mutually adhere together to form a relatively strong layer of vermiculite, and fibrous composite materials containing vermiculite lamellae benefit from this self-adhesion characteristic of the applied lamellae in that the strength and durability of the composite is enhanced. The deposited vermiculite lamellae may act as an adhesive to bond the fibres of the fibrous substrate together and/or to bond the composite to other materials for example to form laminates.

In addition to upgrading the fire resistance and high temperature performance of the fibres to which the coating layer of lamellae is applied, the coating may afford the further advantage of conferring vapour-barrier characteristics and particularly water vapour-barrier characteristics on the fibrous films deposited from suspensions of lamellae, especially vermiculite lamellae, have low vapour transmission coefficients, especially low water-vapour transmission coefficients such that the fibrous composite materials of the invention can be used as barrier layers to inhibit the ingress of water vapour into materials such as foams (where the ingress of water can impair the insulation value of the foam on ageing) or water-degradable materials.

Another advantage afforded by coating combustible fibres with lamellae is that the fibres may be rendered flame-retardant. However flame may tend to spread over the surface of the composite material and if desired there may be incorporated in the composite material and especially the surface thereof flame-retardant additives such as halogenated compounds, antimony trioxide aluminium trihydrate, borates and phosphates.

The fibrous composite materials described hereinbefore and comprising unmodified coatings comprising lamellae of a layer mineral are useful materials for a wide variety of applications. However, in applications where the composite material is liable to be subjected to liquid water, it is preferred to modify the coatings to confer improved water-stability upon the composite. Unmodified coatings tend to disintegrate in liquid water; however, they are readily modified to make them stable in liquid water. Composite materials comprising vermiculite lamellae can be made water stable by treatment with a solution, for example a saturated solution, of a magnesium salt such as magnesium chloride, by treatment with ammonia or the vapour of an alkylamine, or by incorporating a water-stability improver in the suspension of lamellae applied to the fibrous substrate, as is described, for example, in our European Patent Publication No. 0.009.310 A1. Suitable water-stability improvers are particulate compounds sparingly soluble in water and having a basic reaction in water, for example calcium oxide and magnesium oxide.

Magnesium oxide is the preferred water-stability improver and in addition to conferring water-stability to the composite material, this additive enhances the strength of the composite. Magnesium oxide is a particularly desirable additive to gasified (frothed) vermiculite suspensions used to form the composite material in that it additionally enhances the compressive additive to gasified (frothed) vermiculite suspensions used to form the composite material in that it additionally enhances the compressive strength of the cellular (rigid foam) vermiculite matrix of the composite material. The amount of water-stability improver will usually be up to 15% by weight, typically 10%, by weight based on the lamellae.

Water-proofing of the composite materials, as opposed to improving their stability in liquid water, can be effected by incorporating a silicone polymer precursor in the suspension of lamellae prior to application of the suspension to the fibrous material, and treating the composite material with an acidic gas in the presence of water to polymerize the precursor and form a silicone polymer in the composite material. Such a water-proofing process is described in our co-pending United Kingdom Patent Application No. 8103459. Thus, for example, sodium methyl siliconate can be incorporated in the suspension and the resulting composite material treated with carbon dioxide in the presence of water (during drying of the composite material or subsequent to drying the composite and re-wetting it). The amount of silicone polymer precursor added to the suspension will usually be up to about 5% by weight, typically about 2% by weight, based on the lamellae.

Any suspension of lamellae of layer minerals may be used to form the composite materials of the invention. Chemical delamination of layer minerals is well known and any of the known chemical delamination processes may be employed, including the processes described for chemically delaminating vermiculite in United Kingdom Patent Specification Nos. 1,016,385; 1,076,786; 1,119,305; and 1,585,104 and by Baumeister and Hahn in "Micron" 7 247 (1976). After production, the suspension of chemically delaminated layer mineral is subjected to a wet-classification treatment in which larger particles of the mineral are removed, as is described in respect of suspensions of vermiculite lamellae in our United Kingdom Patent Application No. 39510/76:51425/76 and German OLS No. 2.741.859. For use in the process of the present invention, the suspension is wet-classified to a particle size (platelets) below 50 microns, so that the suspension exhibits colloidal properties. Typical suspensions of vermiculite lamellae obtained by the process described in United Kingdom Patent Specification No. 1,585,104, wet-classified to particles of below 50 microns comprise about 40% of particles in the size range 0.4 to 5.0 microns. The fibrous composite materials of the invention can be used in any applications where the corresponding fibrous materials are commonly employed, and additionally they enable particular fibres to be used in numerous applications where hitherto those fibres have been considered unusable because they exhibit unsatisfactory fire performance. Thermal insulation and fire-barrier uses hitherto considered the sole province of asbestos, ceramic fibres and refractory fibres are made available to less expensive, less specialist fibres.

Included amongst the many uses of the fibrous composite material of the invention is the fire-protection of flammable and/or low-melting materials such as rubber and plastic foams, sheets and films, aluminium, wood, paper, cardboard, glass, and the like. For such uses, the fibrous composite material may be provided as a loose covering hot bonded to the flammable substrate but we have found that best results are obtained if the composite is bonded to and laminated with the substrate. The composite may be laminated with the substrate using conventional adhesive although in most cases where the layer mineral is vermiculite, the adhesive nature of the lamellae deposited from suspension enables another adhesive to be dispensed with. Thus for example application of the wet composite (i.e. the fibrous substrate plus vermiculite suspension) will often result in a satisfactory bonding of the composite to the substrate. Alternatively, the composite may be formed in situ on the substrate to be protected, for example by coating the substrate with vermiculite suspension and then pressing a fibrous material onto (and into) the wet vermiculite layer; if desired a further layer of vermiculite may then be applied over the fibrous material to 'face' the laminate with vermiculite lamellae.

The composite material may if desired contain other substances, e.g sizes, lubricants and binders on the fibres, or conventional fire retardant additives. The fibrous composite materials are also useful in applications which do not specifically require fire-retardance and good thermal properties, for example as reinforcement layers for organic and inorganic materials, e.g. polymers, rubbers, plastics and cements. Uses involving reinforcement of organic materials with fibres include GRP (glass reinforced plastic) applications.

The invention is illustrated but in no way limited by the following Examples in which the following general procedure was used to prepare the vermiculite suspensions.

Preparation of Vermiculite Suspensions 150 parts of vermiculite ore (Mandoval micron grade, ex-South Africa) are agitated with saturated sodium chloride solution in 1:2 ratio by weight in a tank for 30 minutes at 80° C. This suspension is then centrifuged and washed with deionised water. The wet cake is transferred to a second tank where the vermiculite is stirred with 1.5 N n-butylamine hydrochloride (2:1 liquid:solid ratio) for 30 minutes at 80° C. This suspension is then centrifuged and washed with deionised water before transferring the wet cake to a swelling tank in which the vermiculite is stirred in deionised water. After swelling, the suspension contains approximately 20% solids and the particles are random sized in the range 300–400 micron. This suspension is then passed through a stone-type mill which reduces approximately 50% of the particles to platelets of size less than 50 microns. This milled suspension is classified in a weir-type centrifugal classifier and the lighter particles with sieve size less than 50 micron are collected for use. Analysis of this 18–21% solids suspension by photosedimentometer and disc centrifuge reveals that approximately 40% of the particles have a size ("equivalent spherical diameter") of 0.4–1.0 micron. The solids content of the suspension is readily adjusted by adding water to it or removing water from it.

EXAMPLE 1

A 4% by weight vermiculite lamellae slurry was prepared using the general procedure described above. Woven cotton sheet of weight 132 g/m². was dipped into this slurry and on removal, excess slurry was squeezed out of the mat. The mat was then dried in air overnight and the weight of vermiculite impregnated in the mat was determined to be 30 g/m².

A 200 mm×130 mm sample of the untreated cotton sheet was subjected to a fire test over a calor gas burner fitted with a circular jet of diameter 40 mm, the sample being held on a tripod stand 30 mm above the burner jet. The temperature of the flame at the sample position was determined as 1075° C. The untreated sheet burned through in 28 seconds leaving a powdery residue with little strength.

A sample of the vermiculite-treated cotton sheet was subjected to the first test. This sample exhibited surface spread of flame at 4 seconds, but retained its dimensional stability in the flame. The spreading flame extinguished rapidly and the penetration residual cotton char resisted flame for 80 seconds whereupon a small breakthrough of flame initiated localised tearing of the structure.

EXAMPLE 2

A variety of textile yarns were treated with vermiculite by dip-coating in 10% w/w vermiculite slurry and tested at 1075° C. in the gas-flame with the following results:

| Fibre | Yarn description | Vermiculite on treated yarn | Burn through time Untreated Yarn | Vermiculite treated yarn |
|---|---|---|---|---|
| Nylon-6:6 | Staple yarn 2 × 18 | 39.0 | 1.5 secs | 20–30 secs |
| Cotton | Egyptian Grey, 2× 30 | 23.9 | 34 secs | 3–5 mins |
| Rayon | Acetate rayon 2 × 100 | 15.5 | 1.8 secs | 2–5 mins |

EXAMPLE 3

Samples of Kraft paper (200 mm×150 mm) were prepared in a hand-mould after blending unbleached Kraft pump in water with 18% w/w classified vermiculite slurry. This technique allows excellent distribution of vermiculite particles throughout the paper. The samples of paper were examined in the 1075° C. gas-flame test with the following results:

| Weight of Kraft pulp (Gm) | Weight of 15% vermiculite slurry (Gm) | Weight of dry paper (Gm) | Burn through time |
|---|---|---|---|
| 10.9 | — | 2.40 | 3 seconds |
| 10.9 | 14 | 2.90 | 2 minutes (edge cracking) |
| 10.9 | 28 | 2.90 | 2 minutes (edge cracking) |
| 10.9 | 40 | 4.59 | 5 minutes |

EXAMPLE 4

A welded polyester fabric of weight 50 g/m² was coated with a 19% by weight suspension of vermiculite lamellae by a knide on roll coating technique to provide a loading of vermiculite of 63 g/m²/(dry weight) on the fabric. The coated fabric was dried in air overnight.

The coated material was flexible and showed no sign of cracking or flaking on repeated flexing. The sample was placed in a bunsen burner flame and flaring was observed as the polyester burned. However, the sample remained intact in the flame and the residue char retained its integrity for 5 minutes, after which time it was removed from the flame.

For purposes of comparison a sample of the untreated polyester fabric was placed in a bunsen burner flame. This sample ignited instantaneously and was completely destroyed in a few seconds.

EXAMPLE 5

An acrylic-bonded polyester non-woven tissue of weight 17 g/m$^2$ was coated with a 19% by weight suspension of vermiculite lamellae and dried. The density of the dry, coated tissue was 94 g/m$^2$. The coated tissue was reasonably flexible. On exposure of the sample to a bunsen burner flame, bried flaming was observed as the polyester burned in the region contacted by the flame, leaving a residual char which remained stable in the flame for several minutes before the sample was removed from the flame.

We claim:

1. A fibrous composite material of essentially two-dimensional configuration consisting essentially of at least about 15% by weight combustible fibers and at least about 20% by weight lamallae of chemically delaminated vermiculite, the lamallae having a thickness of less than 0.5 micron and an aspect ratio of at least 10, substantially all of the lamallae being of size below 50 microns and the fibers being bonded together by the vermiculite.

2. A fibrous composite material as claimed in claim 1 wherein said fibres are present in an amount of at least 20% by weight.

3. A material as claimed in claim 1 wherein the fibres are cellulosic fibres.

4. A material as claimed in claim 1 wherein the loading of the vermiculite is up to 100% by weight based on the fibres.

5. A material as claimed in claim 1 wherein the fibres are present in the form of a layer of fibrous material.

6. A material as claimed in claim 1 wherein the fibres are essentially completely coated with the vermiculite lamellae.

7. A material as claimed in claim 1 which additionally contains a water-stability improver.

8. A material as claimed in claim 7 wherein the water stability improver is magnesium oxide.

9. A material as claimed in claim 1 wherein the chemically dilaminate vermiculated is present in the form of a dry, rigid foam.

10. A material as claimed in claim 1 in which the vermiculite lamallae thickness is less than 0.05 micron.

11. A material as claimed in claim 10 in which the vermiculite lamallae thickness is less than 0.005 micron.

12. A material as claimed in claim 1 in which the vermiculite lamallae have an aspect ratio of at least 100.

13. A material as claimed in claim 12 in which the vermiculite lamallae have an aspect ratio of at least 1000.

14. A material as claimed in claim 1 in which the vermiculite lamallae are less than 0.005 micron thick and have an aspect ratio of at least 1000.

* * * * *